United States Patent [19]

Baumann

[11] 3,904,785

[45] Sept. 9, 1975

[54] METHOD FOR INSULATING ELECTRIC ARMATURE WINDINGS

[75] Inventor: Frederick William Baumann, Scotia, N.Y.

[73] Assignee: General Electric Company, Schenectady, N.Y.

[22] Filed: Jan. 11, 1974

[21] Appl. No.: 432,673

[52] U.S. Cl. ............... 427/120; 427/388; 427/435; 264/104; 427/44
[51] Int. Cl.² .......................................... B44D 1/42
[58] Field of Search .......... 117/93, 113, 232, 128.4; 264/104

[56] References Cited
UNITED STATES PATENTS

| | | | |
|---|---|---|---|
| 2,417,538 | 3/1947 | Alexander | 310/265 |
| 2,442,183 | 5/1948 | Stearns | 118/11 |
| 2,561,982 | 7/1951 | Hanna et al. | 427/46 |
| 3,445,282 | 5/1969 | Olson et al. | 117/232 |
| 3,527,662 | 9/1970 | Elsworth | 117/232 |
| 3,531,321 | 9/1970 | Batzer et al. | 117/232 |
| 3,813,294 | 5/1974 | Pyer et al. | 117/232 X |

Primary Examiner—Michael R. Lusignan
Attorney, Agent, or Firm—Vale P. Myles

[57] ABSTRACT

A method of insulating an electrical conductor, such as a stator winding for an electric motor, is provided wherein the conductor is immersed in a thermosetting epoxy resin and then is rapidly heated by passing a direct current of pre-determined magnitude through the conductor to establish a current density in it in the range of 8,000 to 30,000 amperes per square inch of conductor cross-section. The resultant resistant heating of the conductor and the epoxy resins closely adjacent thereto causes a layer of the resin to gel around the conductor. Heating current is continued until the gelled layer is 5 to 100 mils thick, at which point the current is interrupted and the conductor is withdrawn from the varnish. The final step in the disclosed method is to bake the gelled coating of resin to finally cure it and form a hard insulating finish on the conductor.

12 Claims, 1 Drawing Figure

METHOD FOR INSULATING ELECTRIC ARMATURE WINDINGS

BACKGROUND OF THE INVENTION

The invention relates to methods of insulating electrical conductor and more particularly, to a method for rapidly forming a relatively uniform layer of insulating epoxy varnish on an electrical conductor such as a random wound armature coil for an electric motor.

Generally speaking, there are two well-known methods of applying insulating varnish to electrical conductors. In various applications of one of these methods, a conductor is first immersed in a bath of insulating varnish, then withdrawn from the bath and allowed to drain until only a thin layer of varnish remains on it. Finally, the varnish is baked to cure it. In the second generaly category of conductor insulating methods, a conductor has a thin coating of insulating varnish sprayed or painted onto its outer surface then the coating of varnish is cured by being exposed for a pre-determined time to a baking temperature. It is also a known practice in combination with both such conductor insulating methods to apply electric current to the conductor being coated during the coating operation in order to facilitate the formation of the desired insulating coating on the conductor. For example, in U.S. Pat. No. 3,527,662-Elsworth, which issued on Sept. 8, 1970 and is assigned to the assignee of the present invention, there is disclosed an apparatus and method for impregnating the coil of an electric armature winding with an insulating varnish. In the method disclosed in that patent, an electric current is applied to the winding coils of an armature to heat them while an insulating varnish is sprayed on the exterior surface of the winding. Before the varnish is applied, the coil windings are pre-heated by passing current through them, then the current is continually applied while varnish is dripped onto the coils. The combination of the preheating and continued heating of the coils while varnish is applied causes the varnish to be gelled and subsequently baked to a hard, cured finish. As explained in the Elsworth patent, it is necessary to successfully practice his invention to provide some means for accurately sensing and controlling the temperature of the coil windings during the entire coating operation. An elaborate infra-red sensor and control mechanism is provided toward that end. Thus, the expense and complexity of the system is relatively great compared with the simpler dip forming methods that are available for applying varnish to such coils. Consequently, such dip forming processes are currently more widely preferred. However, other problems are presented by conventional dip forming processes for applying insulating coating to electric coils.

Some of the more significant problems inherent in the various prior art methods of dip forming insulating varnishes on electrical conductors are: (1) such processes tend to be relatively expensive due to the length of time required to successfully apply a coating, or multi-layered coating, of properly cured insulation to a conductor, (2) it is often difficult to control drainage of the dipped conductor to successfully form insulating coatings of uniform thickness on the conductors, and (3) it is virtually impossible with existing methods to prevent air inclusions in the varnish, which are harmful to the integrity of its insulating properties. Accordingly, the insulating capability of the coatings may vary undesirably widely from unit to unit, or within given portions of a single unit, such as the various coil areas of a motor winding. Such shortcomings of conventional dip forming processes have long been understood and several techniques have been developed to cope with them. In this regard, it has been recognized that if the coils are pre-heated before they are immersed in solvent-type coating varnishes, a coating of the varnish can be gelled on the conductor and then the conductor can be removed from the varnish and baked to cure the gelled layer. An example of such a pre-heating method of coating an electrical coil is disclosed in U.S. Pat. No. 2,417,538—Alexander, which issued in Mar. 18, 1947. Although such pre-heating techniques are superior, in the formation of a relatively uniform insulating coating, to prior art methods that did not utilize a heated conductor, it was soon recognized that the relatively quick cooling of the conductor when immersed in a coating varnish caused undesirable disparities in the thickness and quality of the coatings that were formed. Accordingly, as disclosed in U.S. Pat. No. 2,442,183-Stearns, which issued May 25, 1948, an alternative coating method was developed in which electric current is first passed through an armature coil to pre-heat it before it is immersed in a varnish bath. Then, after the armature coil is immersed in a bath of insulating varnish, current is continually applied to the coil for the purpose of thinning the varnish as it flows into the windings, thereby to insure good penetration of the varnish by lowering its viscosity. Another example of a coating method in which an electrical conductor is pre-heated and then continuously heated during its immersion in a coating varnish is shown in U.S. Pat. No. 2,561,982–Hanna et al. which issued July 24, 1951. In the Hanna et al process, an electric motor armature is inductively heated by an induction coil in order to pre-heat the armature to a temperature of approximately 80°C, then the armature is rotated in a varnish bath while the heating is continued thereby to reduce the viscosity of the varnish and increase its penetrating qualities. Although these prior art methods may work reasonably well with solvent-type varnishes, it is difficult to obtain a desirably uniform coating when they are practiced with solventless varnishes.

In particular, when solventless varnishes are used with coating processes that require a pre-heating of the conductor winding to be coated, it is normally necessary to provide some means for measuring the temperature of the coil before it is immersed in the coating varnish, or it is necessary to carefully control the exposure of the varnish bath to the heated coil in order to prevent the entire bath from being gelled or set-up due to the heat radiating from the coil.

From the foregoing description of the known prior art, it is apparent that it would be desirable to provide a method for insulating electrical conductors that would overcome or avoid the shortcomings of the prior art methods pointed out above.

OBJECTS OF THE INVENTION

Accordingly, a primary object of the invention is to provide a method for uniformly coating an electrical conductor with a solventless-type varnish that can be applied quickly and uniformly to the surface of the conductor without requiring means for measuring or sensing the temperature of the conductor during the coating operation.

Another object of the invention is to provide a method for quickly and uniformly coating an electrical conductor by immersing it in a varnish bath and then applying pre-determined electric current density to the conductor to resistant heat it and selectively gel the varnish thereon.

Additional objects and advantages of the invention will become apparent to those skilled in the art from the description of it that follows.

SUMMARY OF THE INVENTION

In one preferred embodiment of the invention, a method for coating an electrical conductor is provided wherein the conductor is immersed in a bath of solventless epoxy resin varnish and a direct current is passed through the conductor to quickly establish a current density therein of 8,000 to 30,000 amperes per square inch of conductor cross-section. The current is continued until a coating of 5 mils to 100 mils in thickness is gelled on the surface of the conductor. Then, the current is discontinued and the conductor is withdrawn from the varnish bath and placed in an oven where the uniformly thick gelled coating is baked to a hard smooth finish. The sudden application of the high density current to the conductor without any pre-heat cycle serves to form a coating of uniform thickness on the conductor without partially curing or gelling the portions of the varnish bath removed more than 100 mils from the conductor.

BRIEF DESCRIPTION OF THE DRAWING

The sole FIGURE of the drawing illustrates a side view, partly in cross-section, of an electric motor armature having a plurality of electrical conductors wound

DESCRIPTION OF A PREFERRED EMBODIMENT

Figure 1:
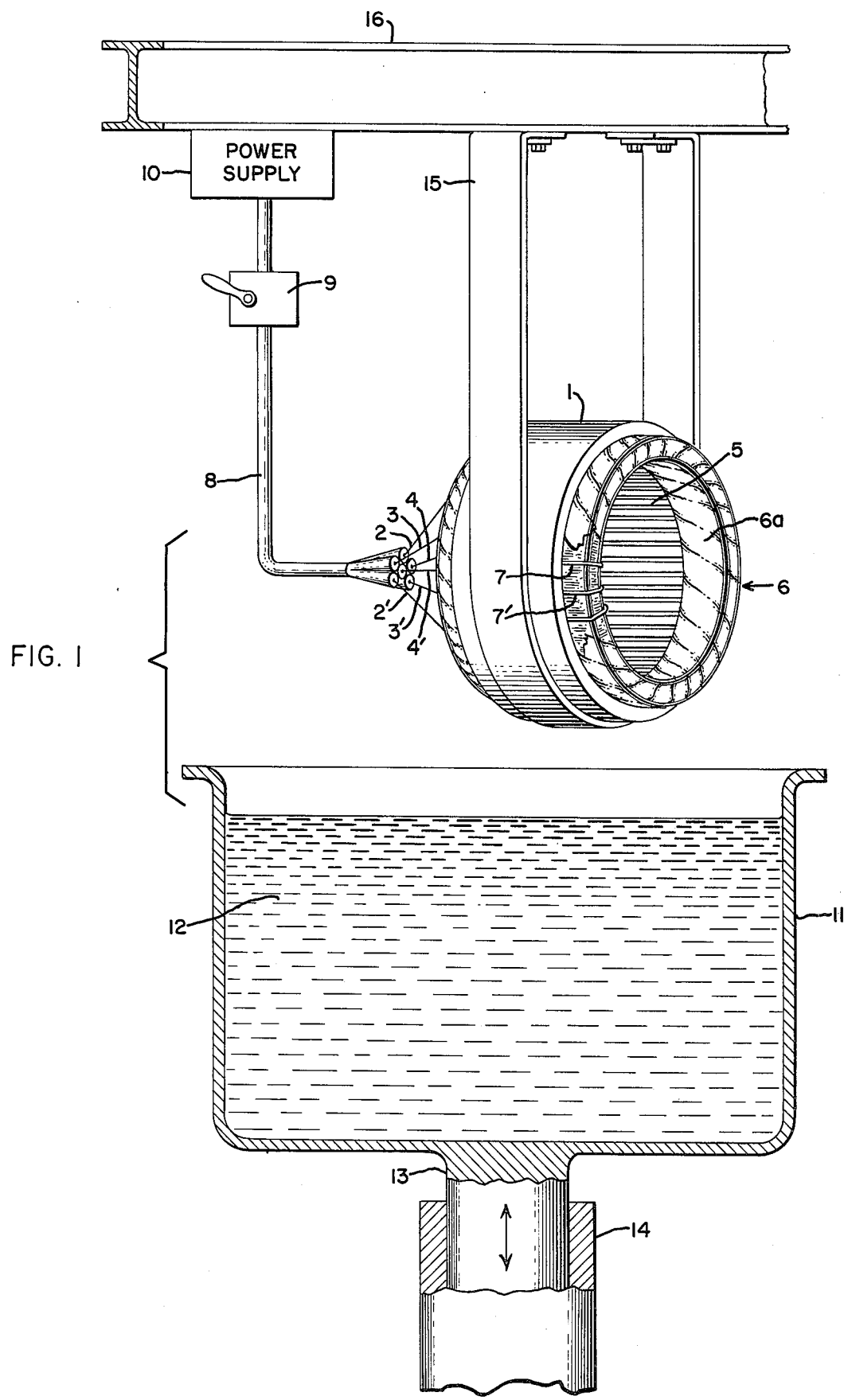

As the preferred embodiment of the invention is described, it will become apparent that the disclosed coating method can be used to coat any form of electrical conductor. It has been found that the method is particularly suitable for use in forming an insulating coating on the conductive windings of an electric motor armature; accordingly, the preferred embodiment of the invention will be described with reference to such an armature. Thus, by referring to the drawing; it will be seen that there is shown an electric motor armature 1 having a plurality of electrical conductors 2–2′, 3–3′ and 4–4′ in the form of conventional motor windings mounted in longitudinal slots 5 on the inner circumferential surface on the armature 1. As shown, each of the three conductors are wound into random wound coils in a well-known manner. In order to restrain the strands of the coils designated generally by the number 6, in their desired pre-determined configuration on the motor, various well-known means may be used. For example, a layer of lap wound tape 6a may be formed around each of the coils, or a plurality of cords 7, 7′, etc., may be wrapped at spaced-apart points around the end turns of the coils as shown in the drawing. Of course, other suitable retaining means may be used to secure the coils in a desired pre-determined configuration prior to their immersion in the manner that will be discussed below.

In this embodiment of the invention, each of the conductors 2–2′ through 4–4′ is formed of conventional magnet wire which has a thin coating of insulating varnish on it. Consequently, the coils will not short-circuit to one another or to the stator 1 when they are mounted in the slots 5 of the stator and energized with electric current.

Pursuant to the invention, it is desired to establish a current density between 8,000 and 30,000 amperes per square inch in each of the conductors 2–2′ through 4–4′ when they are immersed in a varnish bath. Toward this end, each of the conductors is electrically connected in any suitable manner to a power supply cord 8, which in turn, is connected through a power disconnect switch 9 to a direct current power supply 10. The power supply 10 is capable of providing the desired level of current density when the switch 9 is closed. It should be understood that alternating current power could be used for this purpose, but in the preferred embodiment of the invention, it is desired to maintain the voltage across the coils at a low level when they are immersed in the insulating varnish, accordingly, direct current is used.

In accordance with the present invention, a suitable vat or tank 11 is provided and filled with a body of thermosetting epoxy varnish 12 to a depth sufficient to completely immerse the coils on the armature 1 when the tank 11 is raised on a hydraulically actuated pedestal 13 mounted in a suitable cylinder 14, only a portion of which is shown in the drawing. Any conventional hydraulic means may be used to move the tank 11 and it will be appreciated that to practice the invention, alternatively, the tank 11 may be allowed to remain stationary while the armature 1 is lowered into it, if such a mode of operation is desired.

In like manner, various conventional means may be used to support the stator 1 during its immersion. In the disclosed embodiment of the invention, a wide glass strap 15 is positioned around the outer circumference of the stator 1 and secured to a supporting surface such as a girder 16 or other suitable means.

It will be understood that, in practicing the invention, various solventless conventional electrical varnishes (12) may be used to coat the conductors. However, in the preferred embodiment of the invention, the body of varnish 12 comprises a mixture of 70 parts by weight of suitable diglycidyl ether of bisphenol-A, such as Shell Epon 826 or 828, in combination with 30 parts by weight of monoglycidyl ether of the phenol obtained from cashew nut oil and 3 parts by weight of monoethylamine or boron trifluoride monoethylamine complex, with 4 parts by weight of the diglycidylester of hexahydrophthalic anhydride, such as the commercially available Ciba-geigy cy-183. New flexibilizers or flexible resins are normally required in preparing the preferred composition of the invention because the winding being insulated is secured in its final, assembled position before the insulating resin is applied. Thus, these preferred resins are distinguished from the kind of flexible insulating resins disclosed, for example, in U.S. Pat. No. 3,445,282, which issued May 20, 1969 to E. H. Olson et al., and discloses a method of cooling a wire that is subsequently flexed extensively as it is wound on a spool.

In practicing the preferred method of the invention, after the varnish 12 is placed in the tank 11, the pedestal 13 is raised in cylinder 14 by applying a suitable hydraulic pressure thereby to immerse the stator 1 and the conductors 2–2′ through 4–4′ completely in the varnish 12. After the conductors are completely immersed, the power disconnect switch 9 is closed to immediately pass a direct current through each of the coils and establish a current density in the range of 8,000 to 30,000 amperes per square inch of conductor cross-section in the conductors. This high level of current density rapidly heats the epoxy varnish 12 closely adjacent to each of the conductors. The heating operation is continued until a layer of varnish having a thickness in the range of 5 to 100 mils has gelled around each of the conductors. It has been found that such gelling occurs in the range of one-half minute to forty minutes depending on the level of current density applied to the conductors. After the desirable thickness of coating varnish is applied to the conductors, the switch 9 is opened to discontinue the passage of current through the conductors and the stator 1 is removed from the varnish by lowering the tank 11 on its pedestal 13. Subsequently, the uniformly gelled coating of varnish on the conductors is cured to a hard finish by placing the stator 1 in a suitable oven or closely adjacent to strong infra-red lamps in a manner that is well-known in the varnish curing art.

In this embodiment of the invention, the above-specified epoxy varnish 12 comprises a catalyzed epoxy that is virtually inactive at temperatures lower than 80°C and is actively gelled at a temperature of about 120°C. It is a characteristic of this varnish, in connection with the unique application of high density resistance heating current to the conductors 2–2' through 4–4', pursuant to the invention, that a uniform layer of varnish is gelled around each of the conductors without setting up or partially gelling any of the varnish in the remainder of the tank 11.

The post-immersion curing of the gelled layer of varnish on the conductors and armature 1 may be performed at various temperature levels for different periods of time. In the preferred embodiment of the invention, which is designed to efficiently and rapidly coat the conductors of armature 1, the post-immersion bake cycle is performed in an oven heated to approximately 170° for about 4 hours. If a longer bake cycle such as 12 hours is desired, a temperature of approximately 150° will suffice to completely cure the gelled alyer to a hard finish.

Insulating coatings formed by the method of the invention are desirably uniform in thickness and have been found to be capable of withstanding voltages up to 13 kv without being punctured. Lap wound tapes may be used around the individual coils to hold them in position, as suggested above. In such an embodiment, simply the varnish impregnated tape and the layers of pre-gelled varnish would be adequate to completely insulate the coils in normal motor operation.

Although it is not an essential feature of the preferred form of the invention, as disclosed herein, it has been found that the insulating method of the invention can advantageously be practiced in combination with conventional vacuum impregnation processes, for assuring thorough penetration of the insulating resin around the strands of the coil, prior to the application of current to the coil to gel a uniform layer of insulating resin thereon, as described above.

From the foregoing description of the invention, those familiar with the electrical insulation art will recognize that various alternatives and modifications of the invention may be made from the preferred embodiment ot if described above. Accordingly, it is my intention to encompass within the scope of the following claims the true spirit and limits of the invention.

What I claim as new and desire to secure by Letters Patent of the United States is:

1. A method of insulating an electrical conductor comprising the steps of:
    a. providing a bath of thermosetting epoxy varnish,
    b. immersing an electrical conductor in the epoxy varnish,
    c. passing an electric current through the immersed conductor, thereby to establish a current density in the range of 8,000 to 30,000 amperes per square inch of conductor cross-section in the conductor, to rapidly heat it and the epoxy varnish closely adjacent thereto,
    d. continuing the heating operation of step (c) until a layer of varnish having a thickness in the range of 5 to 100 mils has gelled on said conductor,
    e. discontinuing the passage of current through the conductor and removing it from the bath, and
    f. curing the gelled layer of varnish to form a hard finish on the conductor.

2. A method as defined in claim 1 wherein the epoxy varnish is a catalyzed epoxy that is virtually inactive at temperatures lower than 80°C and is actively gelled at a temperature of about 120°C.

3. A method as defined in claim 2 wherein the heating operation of step (c) is continued for a predetermined period of time in the range of ½ to 40 minutes.

4. A method as defined in claim 3 wherein the layer of gelled varnish is cured by baking the varnish at approximately 170°C for about 4 hours.

5. A method as defined in claim 1 wherein the conductor is formed into a coil before it is immersed in the varnish.

6. A method as defined in claim 5 wherein the coil is random wound and including the step of restraining the strands of the coil in a pre-determined configuration during the immersion thereof.

7. A method as defined in claim 6 wherein restraining the strands of the coil is effected by lap winding a layer of tape around the strands of the coil.

8. A method as defined in claim 5 wherein the layer of varnish formed to a hard finish on the conductor is capable of withstanding a voltage of 13 KV without being punctured.

9. A method as defined in claim 6 including a plurality of conductors wound in the method defined in claim 6 to form a plurality of coils and further including a cylindrically shaped magnetic core member for an electric motor, said core member being formed to have a plurality of arcuately spaced-apart winding-receiving slots around one of its circumferential surfaces, said plurality of coils being mounted in said slots prior to the immersion of the coils into the epoxy resin.

10. A method as defined in claim 9 wherein one side of at least two of said coils are disposed, respectively, in each of said slots, the respective strands of each of said coil sides being insulated from one another in said slots only by the epoxy varnish thereon.

11. A method as defined in claim 10 wherein the means for restraining the strands of the respective coils prior to immersion in the varnish comprises a layer of tape lap wound around the strands of each of the coils, and only the varnish impregnated tapes and varnish insulate the coil sides in each slot from one another.

12. A method as defined in claim 10 wherein the electric current applied to the coils of the motor windings to gel the varnish thereon is a direct current.

* * * * *